| United States Patent [19] | [11] 3,716,639 |
| --- | --- |
| Hoegerle et al. | [45] Feb. 13, 1973 |

[54] ANOREXIGENIC TETRAHYDROBENZAZEPINES

[75] Inventors: Karl Hoegerle, Basel; Ernst Habicht, Oberwil, both of Switzerland

[73] Assignee: Ciba-Geigy Corporation, Ardsley, N.Y.

[22] Filed: March 11, 1970

[21] Appl. No.: 23,523

Related U.S. Application Data

[60] Division of Ser. No. 751,381, Aug. 9, 1968, abandoned, which is a continuation-in-part of Ser. No. 705,627, Feb. 15, 1968, abandoned.

[52] U.S. Cl. ............................424/244, 260/239 BB
[51] Int. Cl. ............................................A61u 27/00
[58] Field of Search...................424/244; 260/239 BB

[56] References Cited
UNITED STATES PATENTS

| 3,483,185 | 12/1969 | Tokolics et al. | 260/239 |
| 3,093,632 | 6/1963 | Mull | 260/239 |
| 3,314,963 | 4/1967 | Koch | 260/239 |

FOREIGN PATENTS OR APPLICATIONS

| 1,473,840 | 2/1967 | France | 260/239 |

*Primary Examiner*—Stanley J. Friedman
*Attorney*—Karl F. Jorda and Bruce M. Collins

[57] ABSTRACT

7-chloro-2,3,4,5-tetrahydro-1H-3-benzazepines and pharmaceutically acceptable acid addition salts thereof are prepared; therapeutical compositions containing said compounds and methods for producing an anorexigenic effect in a mammal are provided.

6 Claims, No Drawings

ANOREXIGENIC TETRAHYDROBENZAZEPINES

CROSS-REFERENCE TO RELATED APPLICATIONS

This application is a divisional of Ser. No. 751,381, filed Aug. 9, 1968, which, in turn, is a continuation-in-part of Ser. No. 705,627, filed Feb. 15, 1968, both now abandoned.

DETAILED DISCLOSURE

The present invention concerns tetrahydrobenzazepine derivatives and pharmaceutically acceptable acid addition salts thereof, methods of producing an anorexigenic effect in a mammal and therapeutic compositions containing said benzazepine derivatives and/or said acid addition salts thereof.

More specifically the present invention pertains to 7-chloro-2,3,4,5-tetrahydro-1H-3-benzazepines of Formula I

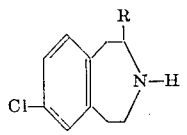
(I)

wherein R is hydrogen or methyl, and pharmaceutically acceptable acid addition salts thereof.

The compounds of Formula I are produced by treating a phenyl-ethylamine derivative of Formula II

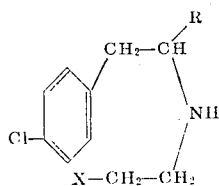
(II)

wherein
R is hydrogen or methyl and
X is chloro, bromo, or iodo or an inorganic acid addition salt of such a compound with a Lewis acid at elevated temperatures, and isolating the reaction product of Formula I in a conventional manner.

Inorganic acid addition salts of the compounds of Formula II suitable for the cyclization reaction are such as derived from, e.g. hydrochloric acid, hydrobromic acid, hydroiodic acid, phosphoric acid, sulfuric acid, preferably hydrochloric acid and hydrobromic acid.

Lewis acids which can be used in the process are, e.g. antimony-(V)-chloride, iron-(III)-chloride, tellurium-(II)-chloride, stannium-(IV)-chloride, titanium-(IV)-chloride, tellurium-(IV)-chloride, bismuth-(III)-chloride, zinc chloride and, in particular, aluminum chloride, as well as the corresponding bromides or iodides. Other Lewis acids suitable for the cyclization process are, e.g., boron trifluoride or boron trichloride. Also sulfuric acid, phosphorous pentoxide or polyphosphoric acid can be used in the process.

The Lewis acid is usually employed in the reaction in an amount of from about 0.5 to 5 mol equivalents preferably from about 1 to 1.5 mol equivalents.

The reaction is carried out at elevated temperatures ranging from about 100° to about 300°. The preferred temperature range is from about 150° to about 250°.

Reaction time varies between about 5 and about 50 hours and is preferably between about 10 and about 20 hours. The tetrahydro-benzazepine formed during the reaction is isolated by cooling the reaction mixture and pouring it on ice. The free base is liberated by addition of a strong base, preferably an inorganic base, e.g., an alkali hydroxide such as sodium hydroxide, potassium hydroxide, or an alkaline earth oxide. The reaction of a phenylalkylamine of Formula II and a Lewis acid can be carried out in the presence or absence of a solvent or diluent. If the presence of a solvent is desired, an aliphatic hydrocarbon such as heptane or cyclohexane, a nitrated hydrocarbon such as nitromethane, nitrocyclohexane or nitrobenzene, a halogenated hydrocarbon such as carbon tetrachloride, ethylene chloride, methylene chloride, o-dichlorobenzene, or also carbon disulfide can be used.

Starting materials of Formula II are obtained by addition of a hydrogen halide, e.g., hydrogen chloride or hydrogen bromide in a known manner to the aziridine derivatives of Formula III.

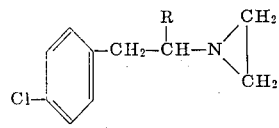
(III)

wherein R is hydrogen or methyl.

The aziridine derivatives of Formula III can be obtained in analogy to a method described in the British Patent Specification No. 692,360 and in analogy to H. Bestian, Ann. 566, 238–239, by addition of ethylenimine to p-chlorostyrene in the presence of an alkali metal, respectively to p-chloro-β-methylstyrene.

Acid addition salts of the tetrahydrobenzazepin derivatives of Formula I are prepared via conventional methods, e.g., by dissolving equimolar amounts of the free base and the acid in a suitable polar solvent, e.g. in water or a lower alkanol and evaporating the solvent, or by dissolving the free base in a suitable relatively unpolar solvent, e.g. in acetone, methyl ethyl ketone, diethyl ether, benzene, carbon tetrachloride and the like and adding the acid or the solution of the acid in a similar or the same solvent, whereupon the acid addition salt precipitates and can be isolated by filtration.

Acids used for the production of acid addition salts are, e.g. hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicylic acid, phenyl-acetic acid, mandelic acid and embonic acid.

7-chloro-2,3,4,5-tetrahydro-1H-3-benzazepine and 2-methyl-7-chloro-2,3,4,5-tetrahydro-1H-3-benzazepine and the acid addition salts thereof have been found to have valuable pharmacological properties, especially anorexigenic activity combined with a low order of toxicity. These favorable properties render the compounds of the invention well suited for the treatment of obesity.

The anorexigenic effects of the compounds of the invention are illustratively demonstrated according to the method of Spengler and Waser, Helv. Physiol. Pharmac. Acta 15, 444–449 (1957) in rats trained to consume food during day-time. Thus it is shown that 7-chloro-2,3,4,5-tetrahydro-1H-3-benzazepine hydrochloride on oral administration in amounts of about 10 mg/kg inhibits food consumption to a very significant extent. The same compound administered intraperitoneally to rats exhibits the same effect already in a dose of 5 mg/kg.

The acute toxicity of 7-chloro-2,3,4,5-tetrahydro-1 H-3-benazepine hydrochloride as demonstrated in rats per os is of low order.

For their intended use the compounds of the invention are administered orally, rectally or, particularly in the form of aqueous solutions of the acid addition salts, also parenterally, in amounts depending on the species, age and weight of the subject under treatment as well as on the particular condition to be treated and the mode of administration.

Generally the daily dosages of the compounds of the invention vary between 0.3 and 10 mg/kg of bodyweight on oral administration.

For administration purposes therapeutical compositions are prepared containing a compound of Formula I and/or at least one pharmaceutically acceptable acid addition salt thereof, an inert pharmaceutical carrier and, if desired, other additives. These compositions are presented for oral, rectal or parenteral administration in dosage units such as tablets, dragees, capsules, suppositories or ampoules, preferably containing as active ingredient 5–50 mg of an active substance according to the invention.

Dosage units for oral administration preferably contain between 1–90 percent of the 7-chloro-2,3,4,5-tetrahydro-1H-3-benzazepines or pharmaceutically acceptable salts thereof as active substance. They may be produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents.

Dyestuffs can be added to these coatings, e.g. to distinguish between varying dosages of active substance.

Other suitable dosage units for oral administration are hard gelatine capsules and also soft closed capsules made of gelatine and a softener such as glycerin. The hard gelatine capsules preferably contain the active substance as a granulate, e.g. in admixture with fillers such as maize starch and/or lubricants such as talcum or magnesium stearate and, optionally, stabilizers such as sodium metabisulfite ($Na_2S_2O_5$) or ascorbic acid. In soft capsules, the active substance is preferably dissolved or suspended in suitable liquids such as liquid polyethylene glycols, to which stabilizers can also be added.

Examples of dosage units for rectal administration are suppositories which consist of a combination of the active substance or a suitable salt thereof with a fatty foundation, or also gelatine rectal capsules which contain a combination of the active substance or a suitable salt thereof with polyethylene glycols.

Ampoules for parenteral, particularly intramuscular administration, preferably contain a water soluble salt of the active substance in a concentration of, preferably, 0.5–5 percent, in aqueous solution, optionally together with suitable stabilizers and buffer substances.

The following examples further illustrate the production of the compounds of the invention and the starting material therefor, as well as the production of therapeutic compositions containing these compounds as active ingredients.

EXAMPLE 1 a. A mixture of 120 g of finely pulverized N-(2-chloroethyl)-p-chloro-phenylethylamine hydrochloride and 133 g of aluminum chloride is stirred and slowly heated up to a temperature of about 170°–180°. This temperature is maintained for about 12 hours whereupon the mixture is cooled to about 100° and poured on ice under stirring. This solution is rendered alkaline by addition of about 2.5 liters of 30 percent aqueous sodium hydroxide solution and extracted several times with ether. The combined ether solutions are dried over magnesium sulfate and potassium carbonate, filtered, and evaporated in vacuo. The residue is distilled at 0.1 mmHg to give 7-chloro-2,3,4,5-tetrahydro-1H-3-benzazepine; bp 110°–115°/0.1 mmHg; $n_D^{20} = 1.5765$.

The hydrochloride is prepared in conventional manner and is recrystallized from acetonitrile; mp 171°–173°.

The starting material used in above reaction is produced according to the following reaction sequence:

b. To a stirred mixture of 200 g of dry ethylenimine and 5 g of metallic sodium is added dropwise 138 g of freshly distilled 4-chlorostyrene in a way that the temperature of the reaction mixture does not exceed 40°. After completion of the addition stirring is continued overnight at room temperature. Unreacted sodium is removed mechanically and the excess ethylenimine is removed in vacuo. The residue is distilled and fractionated at 0.7 mmHg to give 1-(p-chloro-phenylethyl)-aziridine; bp 93°/0.7 mmHg; $n_D^{20} = 1.5357$.

c. Methanol (500ml) is stirred in an ice bath and saturated with hydrogen chloride. A solution of 140 g of 1-(p-chlorophenylethyl)-aziridine in 100 ml of methanol is added dropwise at a temperature of about 10° to 15°. The solution is evaporated to dryness. The residue is dried in vacuo at 60° and recrystallized from acetonitrile to give N-(2-chloroethyl)-p-chloro-phenylethylamine hydrochloride; mp 189°–191°.

EXAMPLE 2 a. A mixture of 30 g of 1-(p-chlorophenyl)-2-(2-chloroethyl-amino)-propan hydrochloride and 33.2 g of aluminum chloride is reacted in analogous manner as described in Example 1. The reaction product is rendered alkaline with 200 ml of 30 percent aqueous sodium hydroxide, extracted with methylene chloride. The methylene chloride extracts are dried over magnesium sulfate, filtered and evaporated in vacuum. The residue is distilled to give 2-methyl-7-chloro-2,3,4,5-tetrahydro-1H-3-benzazepine; bp 137°/14 mmHg; $n_D^{20}$ 1.5635.

The hydrochloride is prepared in conventional manner and is recrystallized from acetonitrile; mp 216–218°.

The starting material used in above reaction is produced as follows:

b. To a solution of 56.3 g of chlorobenzene in 200 ml of carbon disulfide is added 150 g of aluminum chloride. The mixture is refluxed and 79 g of propionic acid anhydride is added whereupon reflux is continued for one hour. Carbon disulfide is distilled off, the residue is poured on 600 g of ice and 300 g of concentrated hydrochloric acid and the oil which separates is extracted with benzene. The combined benzene extracts are washed with water, sodium hydroxide solution and again with water, dried over magnesium sulfate, filtered and evaporated. The residue is distilled to give p-chloropropio-phenone; bp 120°/10 mmHg.

c. To a stirred mixture of 8.9 g of sodium borohydride and two pellets of potassium hydroxide in 150 ml of methanol is added at about 15°–20° within 30 minutes a solution of 57 g of p-chloropropiophenone. The mixture is stirred for 2 hours at 25°–30° and kept at room temperature overnight whereupon 125 ml of 2N hydrochloric acid is added. The acidic mixture is evaporated and the residue extracted with benzene. The benzene layer is dried over sodium sulfate and evaporated. The residue is distilled to give 1-(p-chlorophenyl)-propanol; bp 128°–130°/13 mmHg; $n_D^{20}$ 1.5368.

d. To 5 g of dry sodium hydrogen sulfate preheated to 220 to 230° is added under a vacuum of 100–110 mmHg within 3 hours 54 g of 1-(p-chlorophenyl)-propanol. The reaction is then distilled under about 14 mmHg. The distillate is extracted with ether. The ether extract is dried over magnesium sulfate and sodium bicarbonate and evaporated. The residue is fractionated under vacuum to give p-chloro-β-methyl-styrene, bp 80°–82°/15 mmHg; $n_D^{20}$ 1.5660.

e. To a stirred mixture of 50 g of dry ethylene imine and about 500 mg of metallic sodium is added at room temperature dropwise 33 g of p-chloro-β-methyl-styrene. When the temperature starts to rise after about two hours stirring it is kept by outside cooling at about 30°. Stirring is continued at about 25° for about 30 minutes after the reaction is completed. Unreacted sodium is removed mechanically and the excess ethylene is removed in vacuo. The residue is distilled and fractionated in vacuo to give 1-(p-chlorophenyl)-2-(1-aziridinyl)-propan; bp 120°–121°/14 mmHg; $n_D^{20}$ 1.5272.

f. A solution of 39.5 g of 1-(p-chlorophenyl)-2-(1-aziridinyl)-propan in 100 ml of ethanol is added at 5° within 15 minutes to 150 ml of a saturated ethanolic hydrogen chloride solution. The solution is evaporated until crystallization occurs, then cooled, whereupon the crystals are filtered off. They are recrystallized from ethanol to give 1-(p-chlorophenyl)-2-(2-chloroethylamino)-propan hydrochloride; mp 189°–191°.

EXAMPLE 3

Two hundred and fifty g of 7-chloro-2,3,4,5-tetrahydro-1H-3-benzazepine hydrochloride are mixed with 175.80 g of lactose and 169.70 g of potato starch, the mixture is moistened with an alcoholic solution of 10 g of stearic acid and granulated through a sieve. After drying, 160 g of potato starch, 200 g of talcum, 2.50 g of magnesium stearate and 32 g of colloidal silicon dioxide are mixed in and the mixture is pressed into 10,000 tablets each weighing 100 mg and containing 25 mg of active substance. If desired, the tablets can be grooved for better adaptation of the dosage.

Tablets each containing 25 mg of 2-methyl-7-chloro-2,3,4,5-tetrahydro-1H-3-benzazepine hydrochloride are prepared in analogous manner.

EXAMPLE 4

A granulate is produced from 250 g of 7-chloro-2,3,4,5-tetrahydro-1H-3-benzazepine hydrochloride, 175.90 g of lactose and the alcoholic solution of 10 g of stearic acid. After drying, the granulate is mixed with 56.60 g of colloidal silicon dioxide, 165 g of talcum, 20 g of potato starch and 2.50 g of magnesium stearate and the mixture is pressed into 10,000 dragee cores. These are then coated with a concentrated syrup made from 502.28 g of crystallized saccharose, 6 g of shellac, 10 g of gum arabic, 0.22 g of dyestuff and 1.5 g of titanium dioxide and dried. The dragees obtained each weigh 120 mg and contain 25 mg of active substance.

Dragees each containing 25 g of 2-methyl-7-chloro-2,3,4,5-tetrahydro-1H-3-benzazepine hydrochloride are prepared in analogous manner.

What is claimed is:

1. A method of producing an anorexigenic effect in a mammal suffering from obesity comprising administering to that mammal an anorexigenically effective amount of a compound of the formula

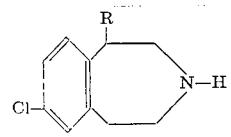

wherein R is hydrogen or methyl or a pharmaceutically acceptable acid addition salt thereof.

2. A method according to claim 1 wherein said compound is 7-chloro-2,3,4,5-tetrahydro-1H-3-benzazepine.

3. A method according to claim 1 wherein said compound is 2-methyl-7-chloro-2,3,4,5-tetrahydro-1H-3-benzazepine.

4. A therapeutic composition consisting essentially of an anorexigenically effective amount of a compound of the formula

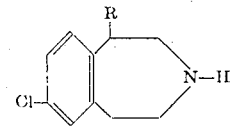

wherein R is hydrogen or methyl or a pharmaceutically acceptable acid addition salt thereof and a solid pulverulent pharmaceutical carrier.

5. A therapeutic composition according to claim 4 wherein said compound is 7-chloro-2,3,4,5-tetrahydro-1H-3-benzazepine.

6. A therapeutic composition according to claim 4 wherein said compound is 2-methyl-7-chloro-2,3,4,5-tetrahydro-1H-3-benzazepine.

* * * * *